US00RE34835E

United States Patent [19]

Ozeki

[11] E Patent Number: Re. 34,835

[45] Reissued Date of Patent: Jan. 24, 1995

[54] METHOD AND APPARATUS FOR EDITING DOCUMENT IN COLORS

[75] Inventor: Masayoshi Ozeki, Chiba, Japan

[73] Assignee: Hitachi, Ltd., Tokyo, Japan

[21] Appl. No.: 622,613

[22] Filed: Dec. 5, 1990

Related U.S. Patent Documents

Reissue of:

[64] Patent No.: 4,789,855
Issued: Dec. 6, 1988
Appl. No.: 702,831
Filed: Feb. 19, 1985

[30] Foreign Application Priority Data

Oct. 11, 1984 [JP] Japan ..... 59-211302

[51] Int. Cl.[6] ..... G09G 5/02

[52] U.S. Cl. ..... 345/153; 345/114; 345/145

[58] Field of Search ..... 340/701, 703, 709, 711, 340/723, 724, 734, 744, 747, 748, 750; 345/114, 153, 145

[56] References Cited

U.S. PATENT DOCUMENTS

| | | | |
|---|---|---|---|
| Re. 31,200 | 4/1983 | Sukonick et al. | 340/734 |
| 3,846,826 | 11/1974 | Mueller et al. | 340/703 |
| 3,911,418 | 10/1975 | Takeda | 340/703 |
| 4,101,879 | 7/1978 | Kawaji et al. | 340/703 |
| 4,354,185 | 10/1982 | Worborschil | 340/709 |
| 4,454,593 | 6/1984 | Fleming et al. | 340/723 |
| 4,467,322 | 8/1984 | Bell et al. | 340/709 |
| 4,550,315 | 10/1985 | Bass et al. | 340/747 |
| 4,627,015 | 12/1986 | Stephens | 340/724 |
| 4,646,250 | 2/1987 | Childress | 340/734 |

OTHER PUBLICATIONS

Kaehler, Carol, Macintosh TM; Apple Computer Corp., 1983; pp. 58–61.

Lee, John D., Wordstar TM and CPIM TM Made Easy; John Wiley & Sons Ltd., New York, 1983; pp. 108–111.

*Primary Examiner*—Richard Hjerpe

*Attorney, Agent, or Firm*—Antonelli, Terry, Stout & Kraus

[57] ABSTRACT

A [device] *method and apparatus* for performing colored editing for a document prepared and displayed by a word processor or microcomputer having a word processing function is disclosed which includes a character information storing means for storing information on each of characters displayed on a display screen, a color information storing means for storing information on the display color and background color of each of the characters, editorial area specifying means for specifying an area of the document displayed on the display screen, as an editorial area, an editorial area storing means for storing positional information of the editorial area specified by the editorial area specifying means, color setting means for setting the display color and background color of characters included in the specified editorial area of the document, and color information processing means for updating the contents of that portion of the color information storing means which corresponds to the specified editorial area, on the basis of color information from the color setting means.

34 Claims, 11 Drawing Sheets

METHOD AND APPARATUS FOR EDITING DOCUMENT IN COLORS

Matter enclosed in heavy brackets [ ] appears in the original patent but forms no part of this reissue specification; matter printed in italics indicates the additions made by reissue.

The present invention relates to a device for editing a document in colors which is suited to be used in editing a document formed by a word processor or a personal computer having a word processing function.

When a document is prepared and edited by a word processor or a personal computer having a word processing function, inputted characters and symbols (hereinafter simply referred to as "characters") are successively displayed on the fluorescent screen (namely, the display screen) of a cathode ray tube (hereinafter referred to as "CRT") display device. In some cases, it is desired to emphasize a given part of the document more than the remaining part. In such cases, an underline is given to the above part of the document, or characters in the part are made larger than other characters. Techniques of this kind are described in a Japanese patent application Laid-open No. 58-134327, a Japanese patent application Laid-open No. 58-56014, and a Japanese patent application Laid-open No. 58-14241.

The CRT display device and other display devices are recently used as the display means of a personal computer having a word processing function, and in most cases the display means can perform color display. Under the present conditions, however, such a personal computer fails to utilize the color display function of the display means effectively in preparing and editing a document.

An object of the present invention is to provide a device for editing a document in colors which can readily change the display color of a given part of a document displayed on a display screen, to emphasize the given part by color display when the document is edited on the display screen.

In order to display characters in colors on the display screen of a color display device, the device is required to include a character information storing means for storing character information on characters displayed on the display screen and color information storing means for storing color information on the display color and background color of the device characters. Thus, a display means can display a predetermined character on the display screen in a predetermined color, on the basis of the information stored in the character information storing means and color information storing means.

The present invention utilizes the above-mentioned fundamental structure of a color display device, and is characterized in that the contents of that portion of the color information storing means which corresponds to a limited area of the display screen, are updated on the basis of specified color data. In order to perform the above updating operation, a device for editing a document in colors according to one embodiment of the present invention includes editorial area specifying means for specifying an area of a document displayed on a display screen, as an editorial area, an editorial area storing means for storing positional information of the editorial area specified by the editorial area specifying means, color setting means for setting the display color and background color of characters included in the specified editorial area, and color information processing means for updating the contents of that portion of the color information storing means which corresponds to the specified editorial area, on the basis of color information from the color setting means.

In a preferred embodiment of a device for editing a document in colors according to the present invention, the editorial area specifying means includes a cursor displayed on the display screen, cursor control means for controllably moving the cursor on the display screen, start position specifying means for specifying a first position where the cursor is located by the cursor control means, as the starting position of an editorial area, and end position specifying means for specifying a second position where the cursor is located by the cursor control means, as the end position of the editorial area, to make it easy to specify the editorial area.

Further, in the preferred embodiment, the cursor control means includes a cursor control key provided on a keyboard, to control the movement of the cursor on the basis of a command from the cursor control key, the start position specifying means and end position specifying means include a special key provided on the keyboard, to specify the start position and end position of the editorial area on the basis of a command from the special key, and the color specifying means includes color specifying keys arranged on the keyboard, to specify the display color and background color of characters included in the specified editorial area of the document, on the basis of commands from the color specifying keys.

In general, a word processor or a personal computer having a word processing function is provided with a central processing unit, a display device, and a keyboard serving as an input device, and therefore can edit a document in colors by including the above-mentioned members additionally.

Further, in the above preferred embodiment, the editorial area storing means includes a first storage portion for storing the start position of the editorial area, and a second storage portion for storing the end position of the editorial area.

The present invention will be apparent from the following detailed description taken in conjunction with the accompanying drawings, in which.

Figure 1:
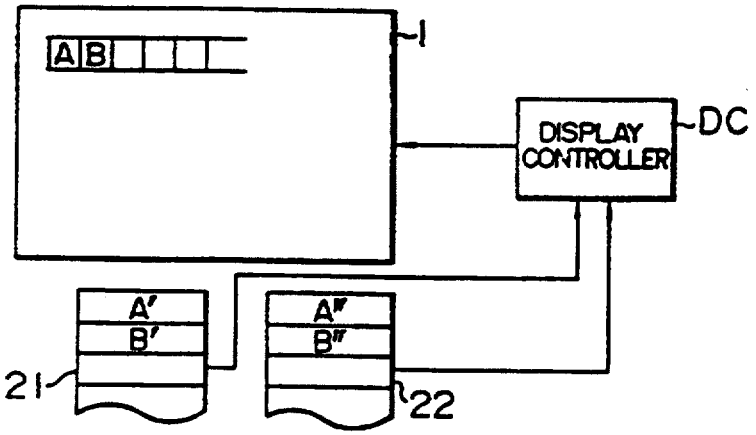
FIG. 1 is a schematic diagram showing the principle of color display.

Now, an embodiment of a device for editing a document in colors according to the present invention will be explained below, with reference to the drawings. FIG. 1 shows the outline of color display, that is, how character information stored in storage areas are processed when characters are displayed on the display screen of a CRT display device. In FIG. 1, reference numeral 1 designates a CRT display device, on the display screen of which characters A and B are displayed in such a manner that the character A is placed at the left end position of uppermost row and the character B is placed at the next position in the same row, and 21 and 22 designate storage portions for storing information with respect to the characters A and B displayed on the display screen. In more detail, reference numeral 21 designates a character information storing portion for storing information with respect to the kind of each of the characters to be displayed, and 22 designates a color information storing part for storing the display color and background color of each of characters to be displayed. Incidentally, in FIG. 1, reference symbol A′ designates information with regard to the kind of the character A, A″ color information with respect to the character A, B′ information with respect to the kind of the character B, B″ color information with respect to the character B, and DC a display control part. The display control part DC reads out information from the character information storing portion 21 and color information storing portion 22, to control the CRT display device 1 on the basis of the readout information so that a predetermined character is displayed at a predetermined position on the display screen with a predetermined color and a predetermined background color.

As is apparent from the above, it is possible to edit a prepared document in colors by modifying the contents of the color information storing portion 22. A display part for displaying a predetermined character at a predetermined position on the basis of the contents of each of the character information storing portion 21 and color information storing portion 22, will be explained later in detail.

Figure 2:
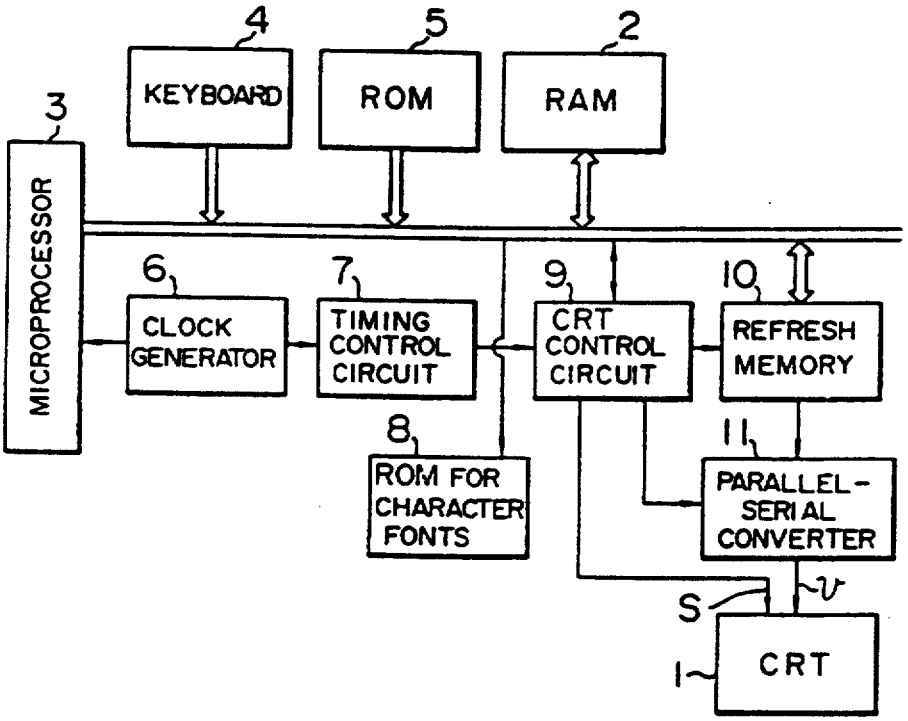
FIG. 2 is a block diagram showing a word processor which includes an embodiment of a device for editing a document in colors according to the present invention.

FIG. 2 is a block diagram showing a word processor which includes an embodiment of a device for editing a document in colors according to the present invention. In FIG. 2, reference numeral 1 designates a CRT, 2 a random access memory (hereinafter referred to as "RAM"), 3 a microprocessor serving as an arithmetic and logic unit, 4 a keyboard acting as an input device, 5 a read only memory (hereinafter referred to as "ROM"), 6 a clock generator for generating a clock signal which is used as the reference signal in operating the word processor, 7 a timing control circuit, 8 an ROM for character fonts, 9 a CRT control circuit, 10 a refresh memory, and 11 a parallel-serial converter.

The word processor is operated as follows. When character data is inputted by a key on the keyboard 4, the microprocessor 3 is operated on the basis of an instruction included in a program which is previously stored in the ROM 5, and a character font corresponding to the inputted character data is transferred from the character font storing ROM 8 to a position in the refresh memory 10. Then, the next character data is inputted by another key on the keyboard 4, and a character font corresponding to the next character data is transferred from the ROM 8 to the next position in the refresh memory 10. As mentioned above, a character font is sent to and stored into the refresh memory 10 each time character data is inputted by a key on the keyboard 4. Such an operation is performed by the microprocessor 3 which has been operated on the basis of the program stored in the ROM 5. The clock generator 6 supplies the microprocessor 3 with the clock signal, to operate the microprocessor 3 regularly.

The clock signal from the clock generator 6 is also applied to the CRT control circuit 9. The CRT control circuit 9 reads out from the refresh memory 10 in a period when the microprocessor 3 does not access the refresh memory 10. The read-out data is converted by the parallel-serial converter 11 into a train of square pulses. The pulse train thus obtained is used as a video signal v which is applied to the CRT 1. The CRT 1 also receives a synchronizing signal s which is delivered from the CRT control circuit 9. Thus, when an instantaneous value of the video signal v takes a high level, a display dot on the display screen of the CRT which corresponds to the above instantenuous value, is made bright. The display screen of the CRT 1 is scanned in such a manner that the first (namely, uppermost) to last scanning lines are successively scanned and each scanning line is scanned from left to right, on the basis of the synchronizing signal s, to be able to use all display dots on the display screen of the CRT 1. Accordingly, the CRT control circuit 9 reads out data from the refresh memory 10 in such a manner that data to be displayed in the first row is successively read out in a direction from left to right and then data to be displayed in the second row is successively read out in a direction from left to right, and the read-out data is sent to the parallel-serial converter 11. The CRT control circuit 9 sends memory addresses to the refresh memory 10 so that data can be read out from the refresh memory 10 in the above-mentioned manner.

Figure 3:
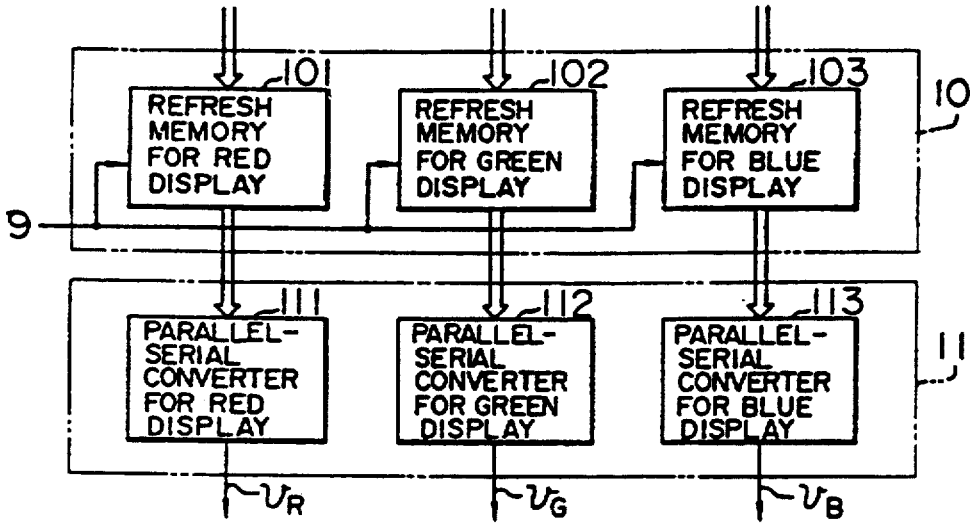
FIG. 3 is a block diagram showing the connection between refresh memories and parallel-serial converters which are required for color display.

Next, the processing for color display will be explained, with reference to FIG. 3. In FIG. 3, reference numerals 101, 102 and 103 designate refresh memories for red display, for green display and for blue display, and 111, 112 and 113 parallel-serial converters for red display, for green display and for blue display. The parallel-serial converters 111, 112 and 113 correspond to the refresh memories 101, 102 and 103, respectively. The operation of each of these parts 101 to 103 and 111 to 113 will be explained below.

The refresh memories 101, 102 and 103 are simultaneously applied with a data read-out instruction which is sent out from the CRT control circuit 9 and includes a read pulse, a row address, a column address, and so on. Thus, the refresh memories 101, 102 and 103 deliver data at the same time. Data from the refresh memories 101, 102 and 103 are applied to the parallel-serial converters 111, 112 and 113, respectively, to be converted into a red video signal $v_R$, a green video signal $v_G$ and a blue video signal $v_B$, each of which has the form of a bit-serial pulse train. The video signal $v_R$, $v_G$ and $v_B$ are applied to the CRT 1, to make bright or dark the red display dots, green display dots and blue display dots, respectively, thereby performing color display.

It can be seen from the above explanation that, when different character data is written in the refresh memories 101, 102 and 103, different characters corresponds to the written-in data are displayed on the display screen of the CRT 1.

Figure 4:
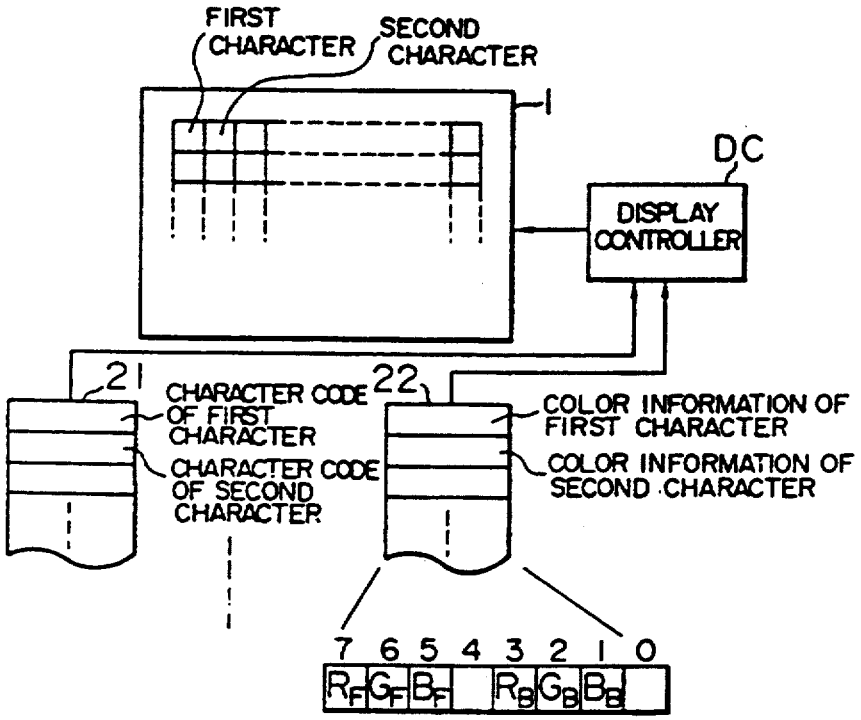
FIGS. 4 and 5a through 5e are schematic diagrams for explaining various storage means or areas.
Figure 5A:
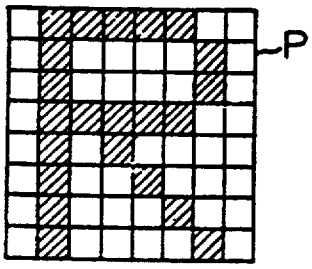
Figure 5B:
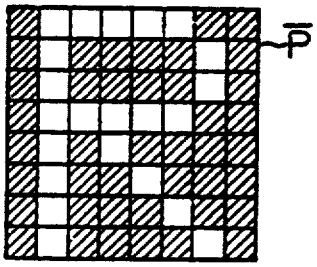
Figure 5C:
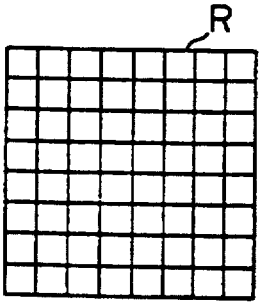
Figure 5D:
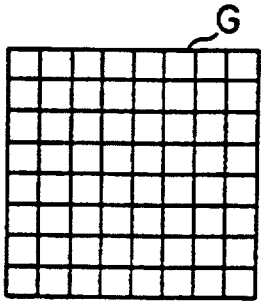
Figure 5E:
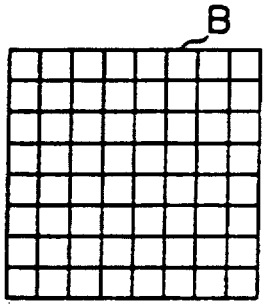

Next, explanation will be made on the editorial processing in colors which is the subject of the present invention. First, the contents of each of various information-storing parts or areas will be explained, with reference to FIGS. 4 and 5a through 5e. As explained previously and shown in FIG. 4, information as to the kind of each of the characters displayed on the display screen of the CRT 1 such as the first and second characters, is stored in the character information storing part 21, and color information with respect to each of these characters is stored in the color information storing part 22. The information as to the kind of the characters and the color information thereof are stored in continuous storage areas of the storing part 21 and continuous storage areas of the storing parts 22, respectively, in accordance with the character display positions on the display screen of the CRT 1. Like a character code, color information of one character is stored in a one-byte storage area. The color information includes information with regard to the display color (hereinafter referred to as "front color") of a character and information with regard to the background color (hereinafter referred to as "back color") of the character. In FIG. 4, reference symbols $R_F$, $G_F$ AND $B_F$ at the seventh, sixth and fifth bits of one byte correspond to a red front color, a green front color and a blue front color, respectively, and reference symbols $R_B$, $G_B$ and $B_G$ at the third, second and first bits correspond to a red back color, a green back color and a blue back color, respectively.

Referring to FIGS. 5a through 5e, when a character code is specified, a character font corresponding to the specified character code is read out from the character font storing ROM 8, and is temporarily stored in a storage area P. Further, the inverted version of the pattern formed in the storage area P is temporarily stored in a storage area $\overline{P}$. In the case where the character font is transferred to the refresh memory 10, data with regard to the character font is temporarily stored in one of a storage area R for red display, a storage area G for green display and a storage area B for blue display. The storing parts 21 and 22 and storage areas P, $\overline{P}$, R, G and B are provided in the RAM 2 at predetermined addresses thereof.

Figure 6:
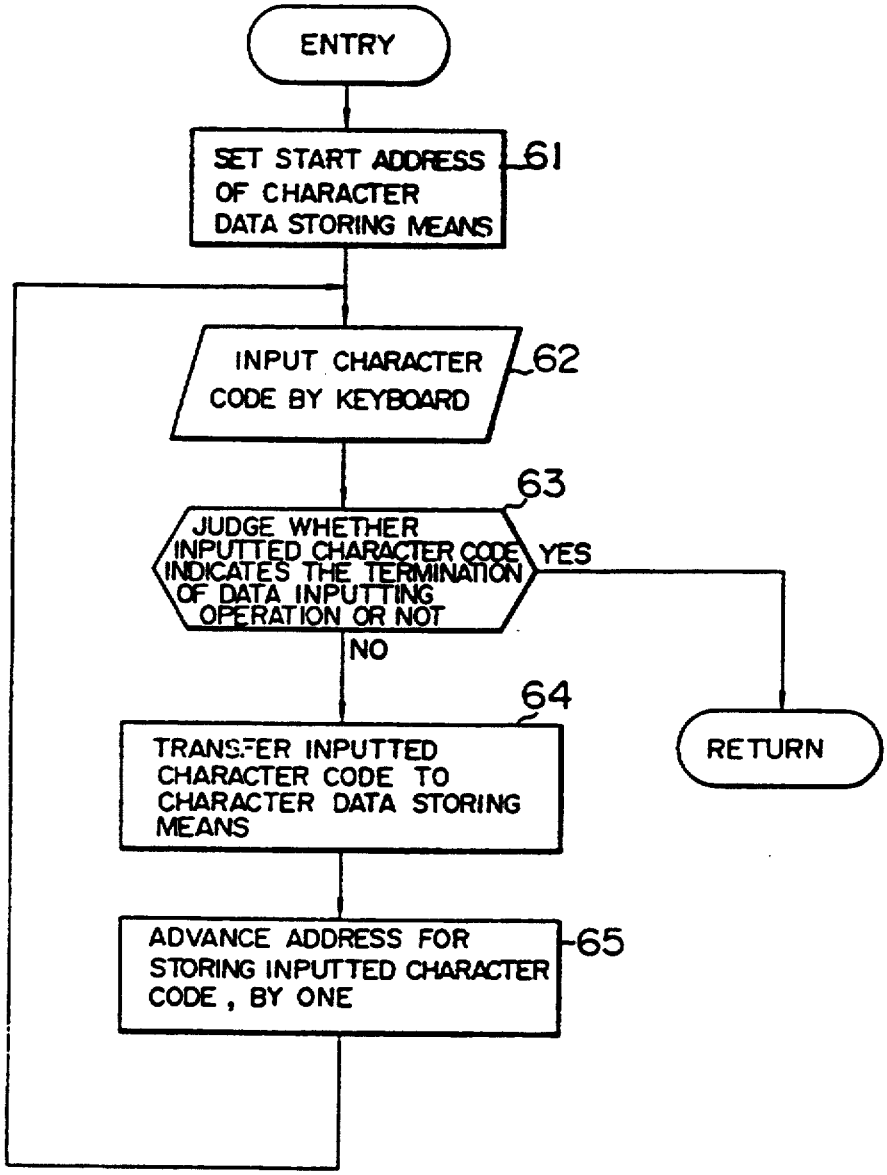
FIG. 6 is a flow chart showing the processing for storing character data in the character data storing part 21 to FIG. 4.

The editorial processing in colors will be explained on the assumption that the character code and color information of each of the characters to be displayed on the CRT 1 are previously stored in the character data storing portion (namely, character information storing portion) 21 and the color information storing portion 22, and on the assumption that characters to be displayed on the CRT 1 have the same color throughout the display area and thus the same value is set in the whole region of the color information storing portion 22. The inputting of data to the character data storing portion 21 and color information storing portion 22 can be performed by well-known techniques and therefore detailed explanation thereof is omitted. The flow chart of FIG. 6 briefly shows a procedure for storing character data in the character data storing portion 21. A program corresponding to the above flow chart is previously stored in the ROM 5. Referring to FIG. 6, a pointer is set to the start address of the character data storing portion 21 which is provided in a predetermined area of the RAM 2 (step 61). Thus, the character data storing portion 21 waits for input data for the keyboard 4. A key on the keyboard 4 is depressed, to input a character code corresponding to the key. It is judged to step 63 whether the inputted character code is a code for indicating the termination of a data inputting operation or not. When the inputted character code is not such a code, the inputted character code is stored in the character data storing portion 21 at an address specified by the pointer (step 64). In step 65, the address specified by the pointer is incremented by one. Then, the processing in step 62 is again carried out, that is, another character code is inputted by means of the keyboard 4. The above-mentioned operation is repeated, and thus character codes are successively stored in the character data storing portion 21. When it is judged in step 63 that the code for indicating the termination of a data inputting operation has been given by the keyboard 4, the data inputting operation for the character data storing portion 21 terminates.

Figure 7:
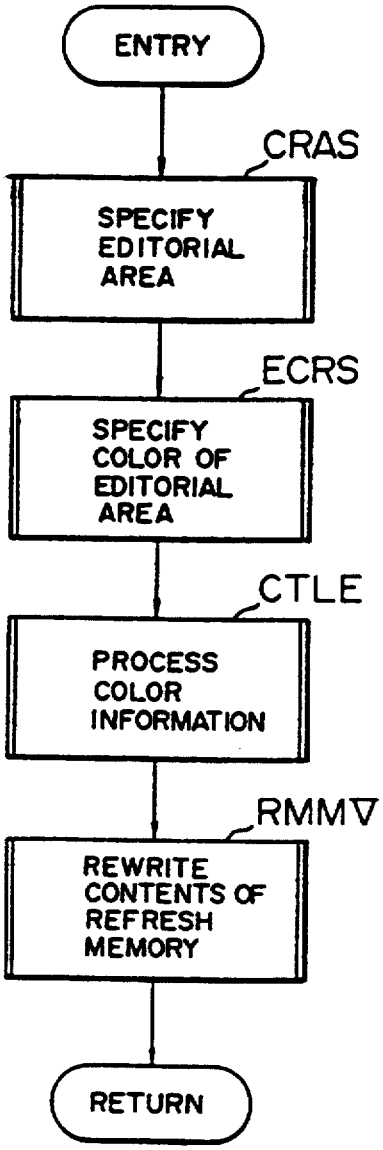
FIG. 7 is a flow chart showing the main routine of editorial processing according to the present invention.

Now, the editorial processing in colors will be explained below. FIG. 7 shows the main routine of an example of the above editorial processing. A program for carrying out the processing shown in FIG. 7 is previously stored in the ROM 5, and is executed by the microprocessor 3. Means for carrying out the above editorial processing is divided into first to fourth functional means. The first functional means is editorial area setting means CRAS. A given area of the document displayed by the CRT 1 is specified as a colored editorial area by the editorial area setting means CRAS. The second of functional means is color setting means ECRS. The display color and background color of characters in the editorial area set by the editorial area setting means CRAS are specified by the color setting means ECRS. The third functional means is color information processing means CTLE for the color information processing portion 22. The contents of that portion of the color information processing portion 22 which corresponds to the editorial area set by the editorial area setting means CRAS, are changed to color data which is set by the color setting means ECRS, by means of the color information processing means CTLE. The fourth functional means is characters font transfer means RMMV for rewriting character font data included in that part of the refresh memory 10 which corresponds to the editorial area set by the editorial area setting means CRAS. When respective contents of the character data storing portion 21 and color information storing portion 22 are updated by the first to fourth functional means CRAS, ECRS, CTLE and RMMV, the previously-mentioned display control part DC transfers the contents of the refresh memory 10 to the CRT 1, to display the document in a desired state.

Figure 8:
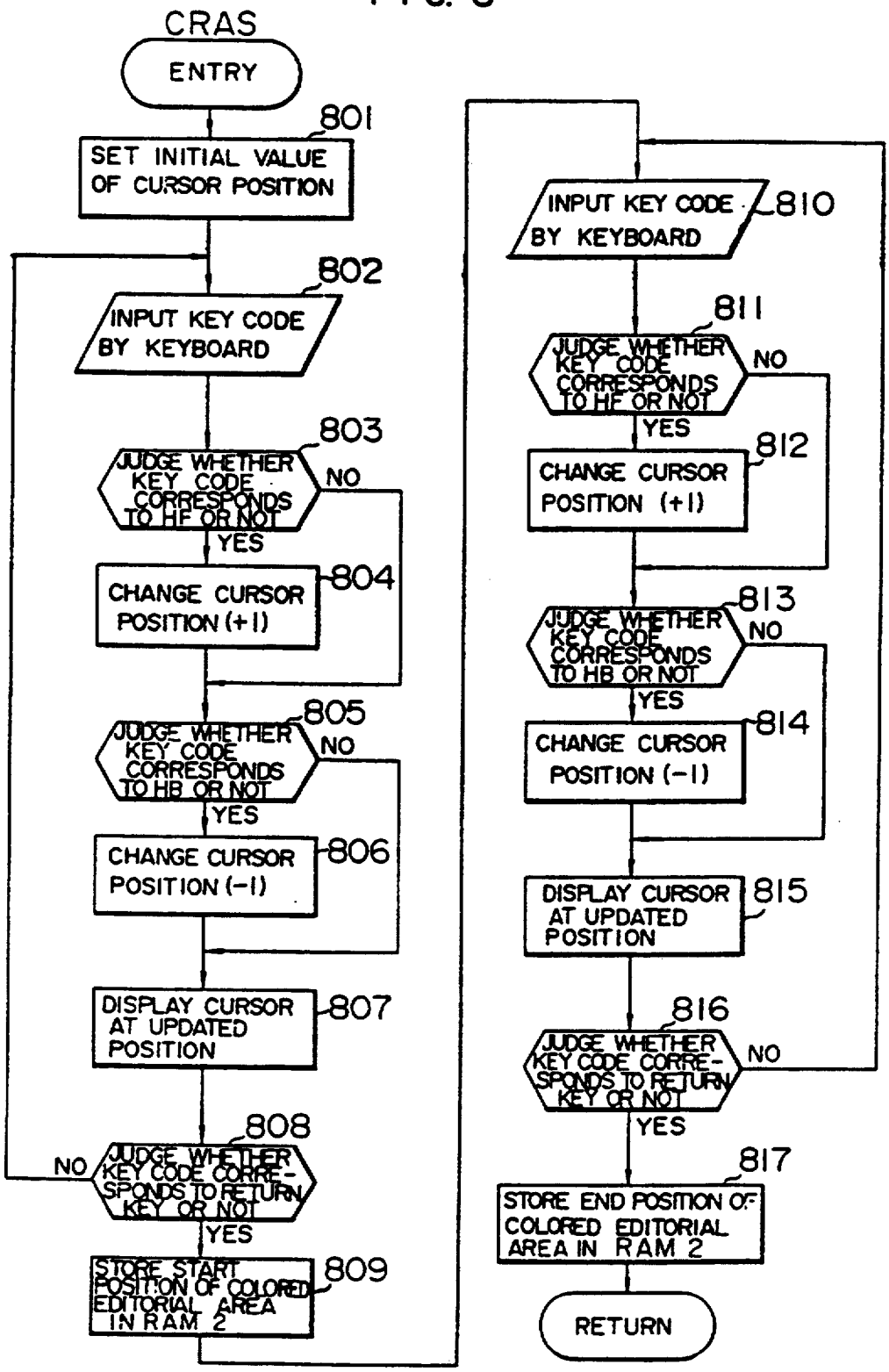
FIG. 8 is a flow chart showing the operation of an example of editorial area specifying means.

Now, the first to fourth functional means CRAS, ECRS, CTLE and RMMV will be explained below in more detail. FIG. 8 is a flow chart showing the operation of an example of the editorial area setting means CRAS. A colored editorial area is set by storing the start and end positions of a desired editorial area in the RAM 2. In the example shown in FIG. 8, the start and end portions of the colored editorial area are specified by a cursor on the display screen which has displayed a document. In more detail, a cursor displayed on the display screen is moved to a desired position by a cursor moving key which is provided on the keyboard 4. When the cursor reaches the desired position, a return key is pressed, to indicate that the desired position on the display screen is the start or end position of the colored editorial area, and to store the desired position in the RAM 2. In this case, each of the start and end positions is given by one of various serial numbers such as [0], [1], [2], . . . and [n] which indicate the display positions on the display screen of the CRT 1. Now, the flow chart of FIG. 8 will be explained below. In step 801, the initial setting of cursor position is performed. That is, the positional value of the cursor placed at the start position of the display screen is set to [0]. In step 802, a key code is inputted by the keyboard 4. In step 803, it is judged whether the inputted key code is a key code corresponding to a horizontal forward movement key HF or not. When the inputted key code is judged to correspond to the horizontal forward movement key HF, the cursor position is advanced by one (step 804). When the inputted key code does not correspond to the horizontal forward movement key HF, the processing in step 805 is carried out, that is, it is judged whether the inputted key code is a key code corresponding to a horizontal backward movement key HB or not. When the inputted key code is judged to correspond to the horizontal backward movement key HB, the cursor position is caused to retrogress by one (step 806). When the inputted key code does not correspond to the horizontal backward movement key HB, the processing in step 807 is carried out, that is, the cursor is displayed at an updated position which is obtained by the processing in step 804 or 806. Further, it is judged in step 808 whether the key code inputted in step 802 corresponds to a return key or not. When the inputted key code does not correspond to the return key, the processing in step 802 is again carried out. The above operation is repeated till the cursor is placed on a desired one of the characters included in a document which is displayed on the display screen of the CRT 1. Then, the return key is depressed, and it is judged in step 808 that the return key has been pressed. In step 809, the present position of the cursor is stored, as the start position of a colored editorial area, in the RAM 2 at a predetermined address thereof. The processing in steps 810 to 817 is carried out to determine the end position of the colored editorial area and to store this end position. The processing in steps 810 to 817 is identical with the processing in steps 802 to 809, except that the processing in step 809 is carried out to store the start position of the colored editorial area in the RAM 2 and the processing in step 817 is carried out to store the end position of the above area in the RAM 2. Therefore, detailed explanation of steps 810 to 817 will be omitted.

Figure 9:
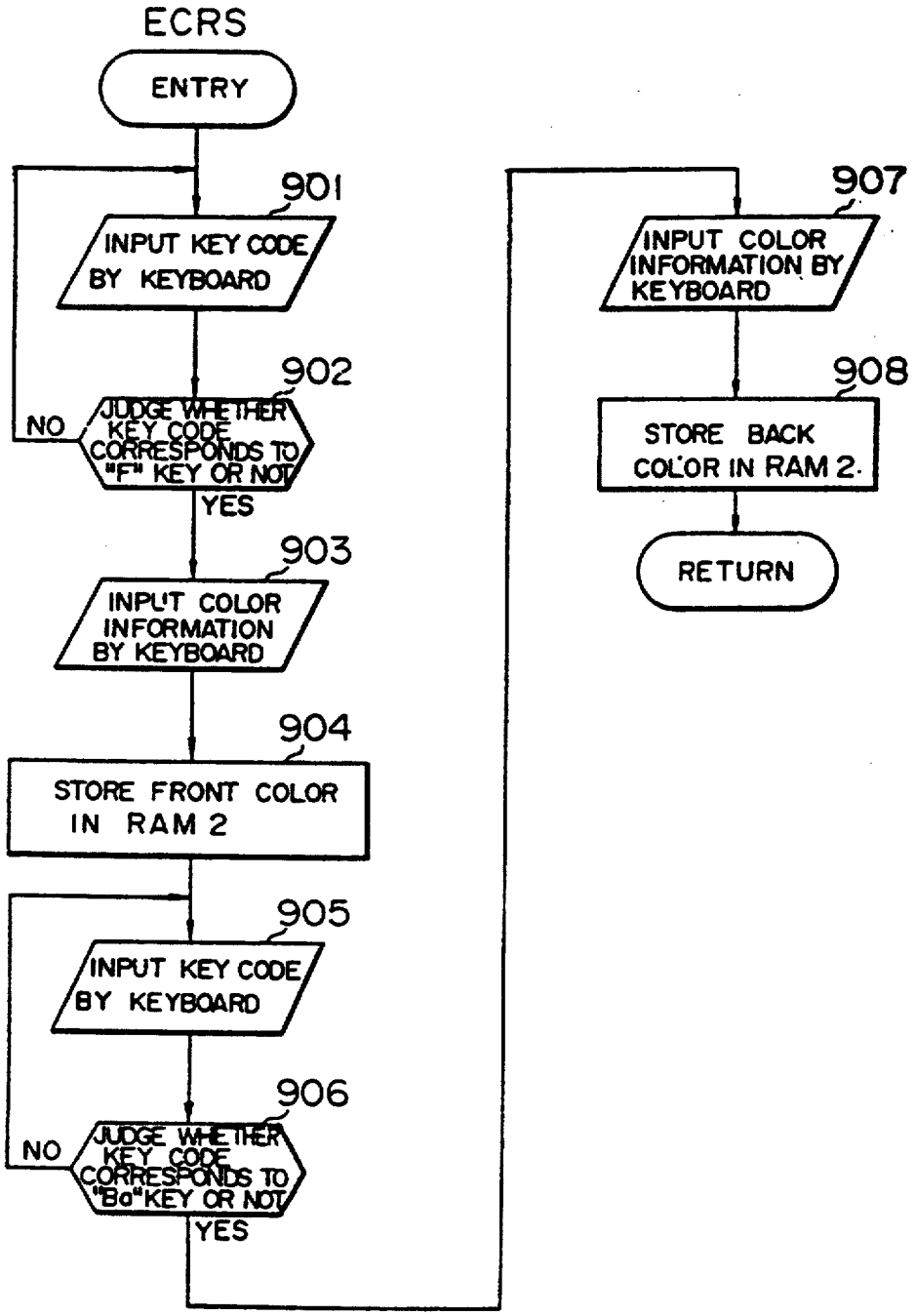
FIG. 9 is a flow chart showing the operation of an example of color specifying means.

FIG. 9 is a flow chart showing the operation of the color setting means ECRS for setting the color of the editorial area. The flow chart of FIG. 9 shows the case where both the front color and the back color are set. That is, in the case where the front color is set, an "F" key is first depressed, and then color specifying keys such as an "R" key, a "G" key and a "B" key are operated. Further, in the case where the back color is set, a "Ba" key is first depressed, and then the color specifying keys such as the "R" key, "G" key and "B" key are operated. The front and back colors thus determined are stored in predetermined storage areas of the RAM 2. The flow chart of FIG. 9 will be explained below in more detail. In step 901, a key code is inputted by the keyboard 4, as in the previously-mentioned step 801. It is judged in step 902 whether the inputted key code corresponds to the "F" key for setting the front color or not. When the inputted key code does not correspond to the "F" key, the processing in step 901 is again carried out. When the inputted key code corresponds to the "F" key, the processing in step 903 is carried out, that is, color information is inputted by the keyboard 4. In step 904, the front color (namely, the display color of characters) indicated by the inputted color information is stored in the RAM 2 at a predetermined address thereof. The processing in steps 905 to 908 is carried out to set the back color. In step 905, a key code is inputted by the keyboard 4 as in step 901. It is judged in step 906 whether the key code inputted in step 905 corresponds to the "Ba" key for setting the back color or not. When the inputted key code does not correspond to the "Ba" key, the processing in step 905 is again carried out. When the inputted key code corresponds to the "Ba" key, the processing in step 907 is carried out, that is, color information is inputted by the keyboard 4. In step 908, the color information inputted in step 907 is stored, as the back color data, in the RAM 2 at a predetermined address thereof.

Figure 10:
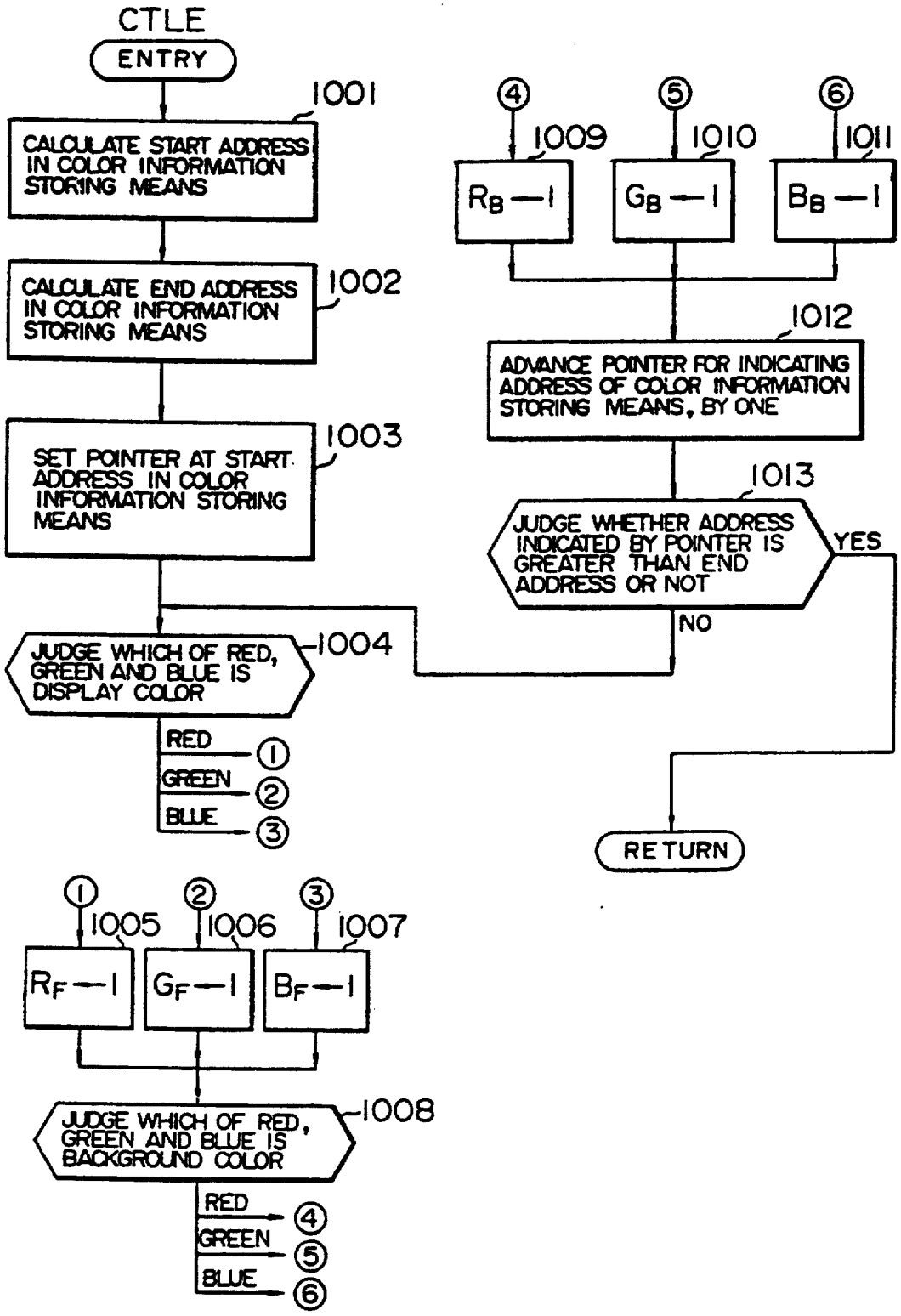
FIG. 10 is a flow chart showing the operation of an example of color information processing means.

FIG. 10 is a flow chart showing the operation of the color information processing means CTLE for processing the color information stored in the color information storing portion 22. According to the means CTLE, the display color of each of the characters included in that portion of the color information storing portion which corresponds to the colored editorial area set by the means CRAS, is set to the color specified by the color setting means ECRS. In more detail, bits which correspond to the above characters and indicate the same color as specified by the means ECRS, are set to a level "1". As mentioned previously, the symbols $R_F$, $G_F$ and $B_F$ in FIG. 4 designate the red front color indicating bit, green front color indicating bit and blue front color indicating bit, respectively, and the symbols $R_B$, $G_B$ and $B_B$ designate the red back color indicating bit, green back color indicating bit and blue back color indicating bit, respectively. Now, the flow chart of FIG. 10 will be explained below in detail. In steps 1001 and 1002, the editorial area start address and editorial area end address in the color information storing part 22 are calculated on the basis of the start and end positions of the colored editorial area by the means CRAS, and are stored in the RAM 2 at predetermined addresses thereof. Next, in step 1003, a pointer for indicating each address of the color information storing portion 22 is set at the start address calculated in step 1001. Further, it is indicated that the following processing is carried out at addresses specified by the pointer. In step 1004, the color information which has been stored in the RAM 2 in step 904 of FIG. 9, is read out, and it is judged which of the red front color, green front color and blue front color is indicated by the read-out color information. One of steps 1005, 1006 and 1007 is selected in accordance with the front color thus determined, and thus one of the bis "$R_F$", "$G_R$" and "$B_R$" at the address indicated by the pointer is set to the level "1". In step 1008, the color information which has been stored in the RAM 2 in step 908 of FIG. 9, is read out, and it is judged which of the red back color, green back color and blue back color is indicated by the read-out color information. One of steps 1009, 1010 and 1011 is selected in accordance with the back color thus determined, and thus one of the bits "$R_B$", "$G_B$" and "$B_B$" at the address indicated by the pointer is set to the level "1". In step 1012, the address indicated by the pointer is advanced by one, to perform the above operation at the next address. It is judged in step 1013 whether the advanced address is greater than the end address calculated in step 1002, or not. When the advanced address is greater than the end address, the color updating processing terminates. When the advanced address is not greater than the end address, the processing in step 1004 is carried out.

Figure 11:
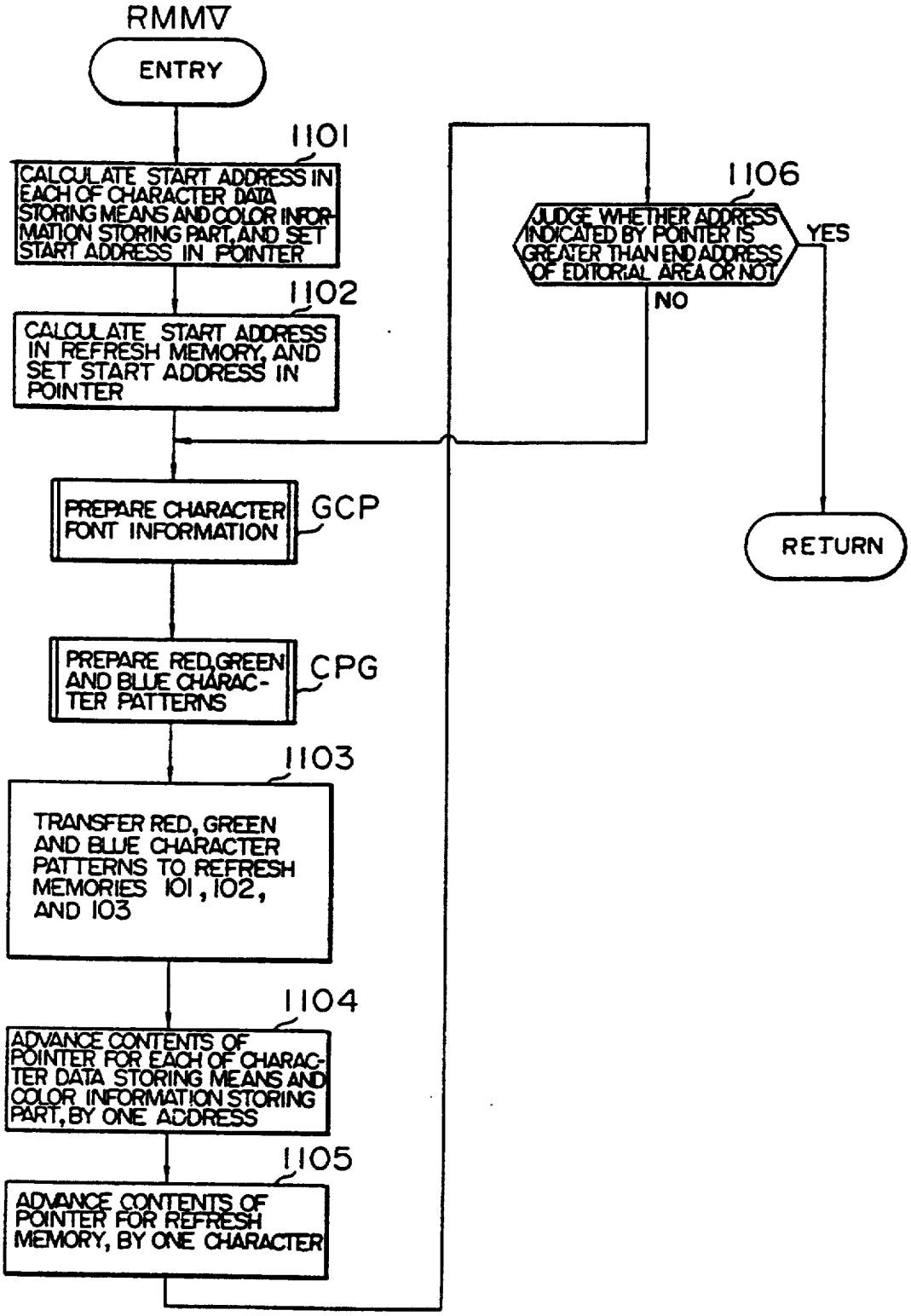
FIG. 11 is a flow chart showing the operation of an example of character font transfer means.

FIG. 11 is a flow chart showing the operation of the character font transfer means RMMV. That is, FIG. 11 shows the processing for modifying (or editing) the front color and back color of character fonts included in that portion of the refresh memory 10 which corresponds to the colored editorial area. Now, the flow chart of FIG. 11 will be explained below in detail. In step 1101, those addresses of the character data storing portion 21 and color information storing portion 22 which correspond to the start position of the colored editorial area set by the means CRAS, are calculated on the basis of the above start position, and each of these addresses is set in a pointer. Similarly, in step 1102, that address of the refresh memory 10 which corresponds to the start position of the colored editorial area, is calculated and is set in a pointer. Next, character font information is prepared by character font preparing means GCP which will be explained later. Then, red, green and blue character patterns are prepared by character pattern preparing means CPG which will be explained later. Thereafter, in step 1103, the red, green and blue character patterns thus obtained are transferred respectively to those addresses of the refresh memories 101, 102 and 103 which are indicated by pointers. Such processing is carried out throughout the colored editorial area. That is, in step 1104, the next one of that address of the character data storing portion 21 which has been calculated in step 1101, is set in the pointer, and further the next one of that address of the color information storing portion 22 which has been calculated in step 1101, is set in the pointer. In step 1105, the contents of the pointer having stored that address of the refresh memory 10 which has been calculated in step 1102, are advanced by one character. In step 1106, it is judged whether an address indicated by each pointer is greater than an address corresponding to the end position of the colored editorial area or not. When the address indicated by the pointer is not greater than the address corresponding to the above end point, the processing by the character font information preparing means GCP is again carried out. When the address indicated by the pointer is greater than the address corresponding to the end position, the above processing for the refresh memory 10 terminates.

Figure 12:
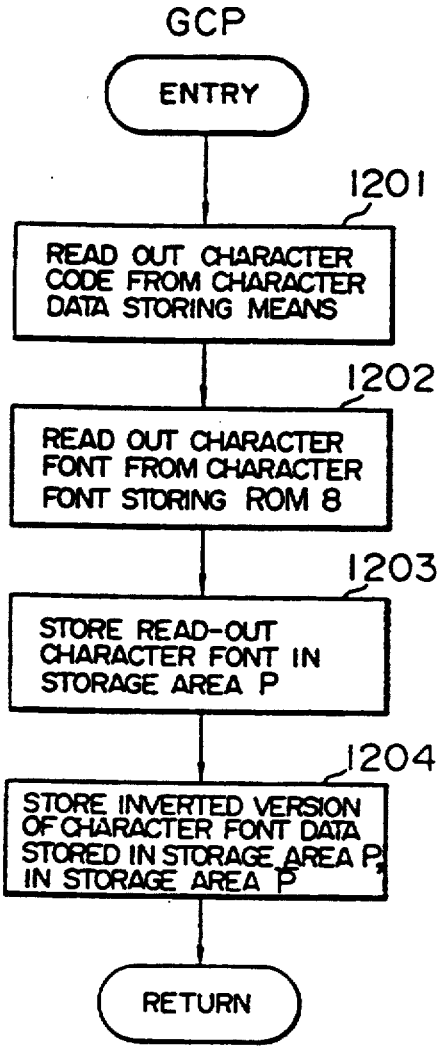
FIG. 12 is a flow chart showing the operation of an example of character font information preparing means.

FIG. 2 is a flow chart showing the operation of the character font information preparing means GCP. Referring to FIG. 12, a character code is read out from the character data storing part 21 (step 1201). Then, a character font corresponding to the character code is read out from the character font storing ROM 8 (step 1202). Incidentally, character fonts are stored in the ROM 8 in order of character codes. The read-out character font is temporarily stored in a predetermined storage area P of the RAM 2 (step 1203). An inverted version of character font data stored in the area P is temporarily stored in another predetermined storage area $\overline{P}$ of the RAM 2.

Figure 13:
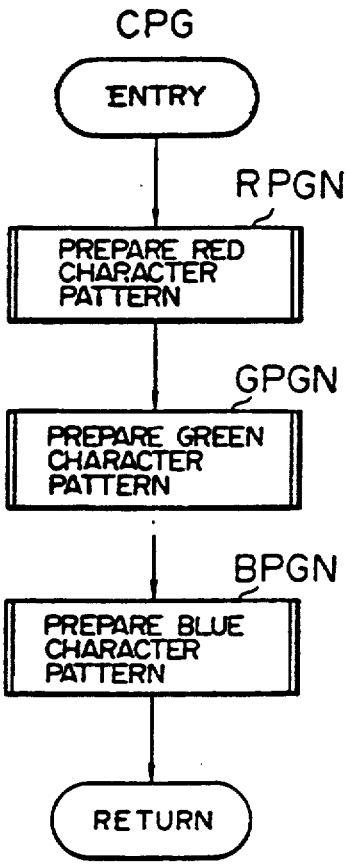
FIG. 13 is a flow chart showing the operation of an example of character pattern preparing means.
Figure 14:
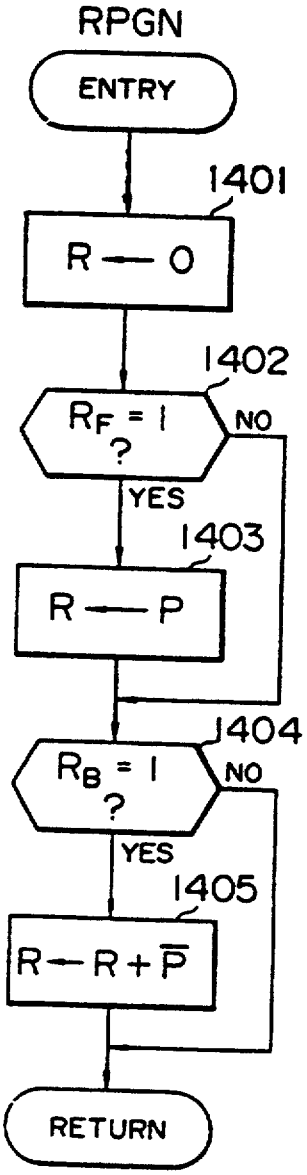
FIGS. 14, 15 and 16 are flow charts showing the operation of an example of each of red character pattern preparing means, green character pattern preparing means and blue character pattern preparing means.

FIG. 13 is a flow chart showing the operation of the character pattern preparing means CPG. Referring to FIG. 13, red character pattern, green character pattern and blue character pattern which will be transferred to the refresh memories 101, 102 and 103, respectively, are prepared in the storage areas R, G and B of FIGS. 5a, 5b and 5c, by means of red character pattern preparing means RPGN, green character pattern preparing means GPGN and blue character pattern preparing means BPGN. The operation of each of the means RPGN, GPGN and BPGN will be explained below in detail, with reference to FIGS. 14, 15 and 16. FIG. 14 is a flow chart showing the operation of the red character pattern preparing means RPGN. Referring to FIG. 14, the zero clear is performed for the storage area R (step 1401). Then, it is judged in step 1402 whether the bit $R_F$ in the color information storing part 22 has a level "1" or not. When the bit $R_F$ has the level "1", the character font information which has been stored in the storage area P in step 1203 of FIG. 12, is transferred to the storage area R (step 1403). Then, it is judged in step 1404 whether the bit $R_B$ in the color information storing part 22 has the level "1" or not. When the bit $R_B$ has the level "1", the logical sum of the character font information which has been stored in the storage area $\overline{P}$ in step 1204 of FIG. 12, and the character font information stored in the storage area R, is produced and stored in the storage area R (step 1405).

Figure 15:
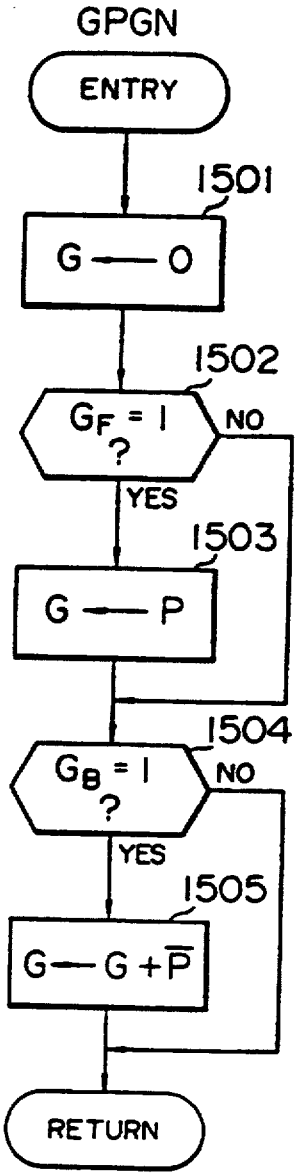

FIG. 15 is a flow chart showing the operation of the green character pattern preparing means GPGN. Referring to FIG. 14, the zero clear is performed for the storage area G (step 1501). Then, it is judged in step 1505 whether the bit $G_F$ in the color information storing part 22 has the level "1" or not. When the $G_F$ has the level "1", the character font information which has been stored in the storage area P in step 1203 of FIG. 12, is transferred to the storage area G (area 1503). Then, it is judged in step 1504 whether the bit $G_B$ has the level "1" or not. When the bit $G_B$ has the level "1", the logical sum of the character font information which has been stored in the storage area $\overline{P}$ in step 1204 of FIG. 12, and the character font information stored in the storage area G, is produced and stored in the storage area G (step 1505).

Figure 16:
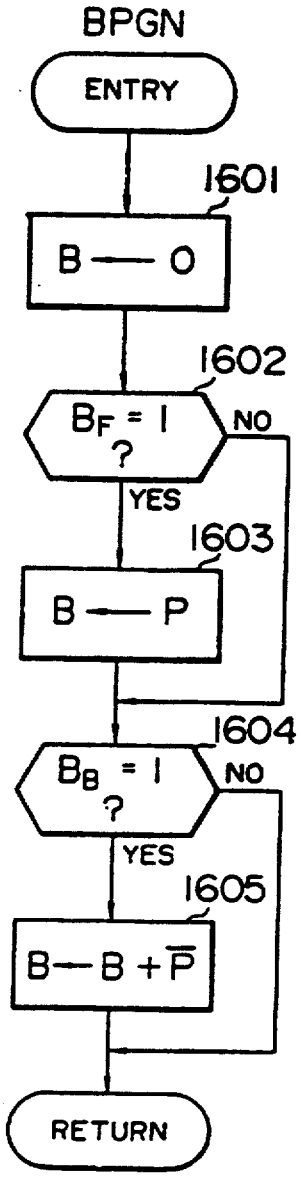

FIG. 16 is a flow chart showing the operation of the blue character pattern preparing means BPGN. Referring to FIG. 16, the zero clear is performed for the storage area B (step 1601). Then, it is judged in step 1602 whether the bit $B_F$ in the color information storing portion 22 has the level "1" or not. When the bit $B_F$ has the level "1", the character font information which has been stored in the storage area P in step 1203 of FIG. 12, is transferred to the storage area B (step 1603). Then, it is judged in step 1604 whether the bit $B_B$ has the level "1" or not. When the bit $B_B$ has the level "1", the logical sum of the character font information which has been stored in the storage area $\overline{P}$ in step 1204 of FIG. 12 and the character font information stored in the storage area B, is produced and stored in the storage area B (step 1605).

As has been explained in the foregoing, a cursor is placed at the start position of that area of a document displayed on the display screen of the CRT 1 which is required to be emphasized by color display, and then a return key is depressed. Further, the cursor is placed at the end position of the above area, and then the return key is depressed. Thus, a colored editorial area can be set. Further, the above area of the document can be emphasized by color display, by operating a key corresponding to a desired background color. Thus, a document editing device is obtained which utilizes a color display device effectively.

In the above-mentioned embodiment, a CRT display device has been used for display purposes. However, various display devices such as a liquid crystal display device and a plasma display device can be used in place of the CRT display device. Further, in the embodiment, the start and end positions of an editorial area have been set in such a manner that a cursor is moved to a desired position by a cursor moving key on the keyboard and then a return key is depressed. However, the above positions may be set by coordinate inputting devices such as a light pen, a finger touch input device, a tablet, a mouse, and a joystick. Further, various members having the same function as the return key can be used in place the return key.

Further, in the embodiment, various programs have been stored in the ROM 5. However, the programs may be stored in the RAM 2 before a word processor or the like is operated. That is, the programs are stored in the ROM 5 or RAM 2, depending upon the structure of the word processor or the like.

In the embodiment, arithmetic operations based upon programs have been performed by the microprocessor 3. Needless to say, general arithmetic and logic units similar in function to the microprocessor 3 may be used in place of the microprocessor 3.

I claim:

1. A device for editing a document in colors, comprising:

character information storing means for storing character identification information as to each of a number of characters included in a document which is to be displayed on a display screen;

color information storing means associated with said character information storing means for storing color information as to at least one of the display color and background color of each of said characters;

display means for displaying a document on said display screen in a predetermined color, including dot pattern reflush memory means for storing dot pattern data based on information stored in said character information storing means and said color information storing means;

editorial area specifying means for selectively specifying a desired character or character string in the document displayed on said display screen, as an editorial area, by referring to said desired character or character string on the display screen;

editorial area storing means for storing positional information corresponding to the editorial area specified by said editorial area specifying means;

color specifying means for specifying and storing at least one of the display color and background color of characters in said specified editorial area of said document in the form of color specifying information in response to an operator command; and color information processing means coupled between said editorial area storing means and said color specifying means for updating the contents of a portion of said color information storing means which corresponds to said editorial area, on the basis of color specifying information from said color specifying means, whereby dot pattern data stored in said dot pattern refresh memory means is modified in response to said updating of said color information storing means.

2. A device for editing a document in colors as claimed in claim 1, wherein said editorial area specifying means includes a cursor displayed on said display screen, cursor control means for controllably moving said cursor on said display screen, start position specifying means for specifying a first position where said cursors is located by said cursor control means as the start position of said editorial area, and end position specifying means for specifying a second position where said cursor is located by said cursor control means as the end position of said editorial area.

3. A device for editing a document in colors as claimed in claim 2, wherein said cursor control means includes a cursor control key provided on a keyboard and the movement of said cursor is controlled on the basis of a command from said cursor control key.

4. A device for editing a document in colors as claimed in claim 2, wherein said start position specifying means and said end position specifying means include a special key provided on a keyboard, and said start position and end position of said editorial area are specified on the basis of a command from said special key.

5. A device for editing a document in colors as claimed in claim 2, wherein said editorial area storing means includes a first storage portion for storing information as to the start position of said editorial area specified by said start position specifying means, and a second storage portion for storing information as to the end position of said editorial area specified by said end position specifying means.

6. A device for editing a document in colors as claimed in claim 1, wherein said color specifying means includes a color specifying keys arranged on a keyboard, and the display color and background color of characters included in said specified editorial area of said document are specified on the basis of commands from said color specifying keys.

7. A device for editing a document in colors as claimed in claim 1, wherein said editorial area storing means includes a first storage portion for storing the start position of said editorial area and a second storage portion for storing the end position of said editorial area.

8. A device for editing a document in colors, comprising:

character information storing means for storing character identification information as to each of a number of characters included in a document which is to be displayed on a display screen;

color information storing means associated with said character information storing means for storing color information as to the display color and background color of each of said characters;

display means for displaying a document on said display screen in a predetermined color, including dot pattern refresh memory means for storing dot pattern data based on information stored in said character information storing means and said color information storing means;

means for displaying a cursor on said display screen;

cursor control means for controllably moving said cursor on said display screen;

start position specifying means for selectively specifying a first position where said cursor is located by said cursor control means as the start position of a desired editorial area;

end position specifying means for selectively specifying a second position where said cursor is located by said cursor control means as the end position of the desired editorial area;

first storage means for storing positional information as to the start position of an editorial area specified by said start position specifying means;

second storage means for storing positional information as to the end position of the editorial area specified by said end position specifying means;

color specifying means for specifying and storing in the form of color setting information the display color and background color of characters included in an editorial area of said document in response to operator selection, said editorial area being specified by the positional information stored in said first storage means and the positional information stored in said second storage means; and color information processing means for updating the contents of a portion of said color information storing means which corresponds to said editorial area of said document, on the basis of color setting information stored in said color specifying means, whereby dot pattern data stored in said dot pattern refresh memory means is modified in response to said updating of said color information storing means.

9. A device for editing a document in colors as claimed in claim 8, wherein said cursor control means includes a cursor control key provided on a keyboard, and the movement of said cursor is controlled on the basis of a command from said cursor control key.

10. A device for editing a document in colors as claimed in claim 8, wherein said start position specifying means and said end position specifying means include a special key provided on a keyboard, and the start position and end position of said desired editorial area are specified on the basis of a command from said special key.

11. A device for editing a document in colors as claimed in claim 8, wherein said color specifying means includes color specifying keys arranged on a keyboard, and the display color and background color of characters included in said specified editorial area of said document are specified on the basis of commands from said color specifying keys.

*12. A device for editing a document in colors, comprising:*

*(a) character information storing means for storing information of each of characters included in a document which is to be displayed on a display screen;*

*(b) color information storing means for storing color information as to at least one of the display color and background color of each of said characters;*

*(c) editorial area specifying means for specifying a desired editorial area of the document which is to be displayed on the display screen, in response to an input of an operator;*

*(d) editorial area storing means for storing the editorial area specified by said editorial area specifying means;*

*(e) color specifying means for specifying color information specifying at least one of the display color and background color for certain characters of said document displayed on the display screen in response to an input of the operator;*

*(f) dot pattern refresh storing means for storing dot pattern display information to be displayed on the display screen which is generated based on information stored in said character information storing means and said color information storing means; and*

*(g) color information processing means for updating the contents of said color information storing means which corresponds to said editorial area, on the basis of color specifying information from said color information specifying means, whereby dot pattern information stored in said dot pattern refresh storing means is modified in response to said updating of said color information storing means.*

*13. A device according to claim 12, wherein said editorial area specifying means includes a first memory storing a start position of said editorial area and a second memory storing an end position of said editorial area.*

*14. A device for editing a document in colors, comprising an input unit and a processing unit,*

*said input unit comprising:*

*(a) editorial area specifying means for specifying a desired editorial area of a document which is to be displayed on a display screen, in response to an input of an operator; and*

*(b) color specifying means for specifying and outputting color information specifying at least one of the display color and background color of certain characters of said document displayed on the display screen in response to an input operation by the operator;*

*said processing unit comprising:*

*(c) character information storing means for storing information of each of characters included in a document which is to be displayed on said display screen;*

*(d) color information storing means for storing color information as to at least one of the display color and background color of each of said characters;*

*(e) dot pattern refresh storing means for storing dot pattern display information which is generated based on information stored in said character information storing means and said color information storing means;*

*(f) editorial area storing means for storing an editorial area of a document to be displayed based on input information from said editorial area specifying means; and*

*(g) color information processing means for updating the contents of said color information storing means which corresponds to said editorial area stored in said editorial area storing means, on the basis of color specifying information from said color information specifying means, whereby dot pattern information stored in said dot pattern refresh storing means is modified in response to said updating of said color information storing.*

*15. A device according to claim 14, wherein said editorial area specifying means comprises:*

*cursor control means for controllably moving on the display screen, a cursor displayed thereon;*

*start position specifying means for specifying a first position where said cursor is located by said cursor control means as the start position of said editorial area; and*

*end position specifying means for specifying a second position where said cursor is located by said cursor control means as the end position of said editorial area.*

*16. A device according to claim 15, wherein said cursor control means includes a cursor control key provided on a keyboard and the movement of said cursor is controlled on the basis of a command from said cursor control key.*

*17. A device according to claim 15, wherein said start position specifying means and said end position specifying means include a special key provided on a keyboard, and said start position and said end position of said editorial*

*area are specified on the basis of a command from said special key.*

*18. A device according to claim 15, wherein said editorial area storing means includes a first storage portion for storing information as to the start position of said editorial area specified by said start position specifying means, and a second storage portion for storing information as to the end position of said editorial area specified by said end position specifying means.*

*19. A device according to claim 15, wherein said color specifying means includes color specifying keys arranged on a keyboard, and the display color and background color of characters included in said specified editorial area of said document are specified on the basis of commands from said color specifying keys.*

*20. A device according to claim 15, wherein said editorial area storing means includes a first storage portion for storing the start position of said editorial area and a second storage portion for storing the end position of said editorial area.*

*21. A device for editing a document in colors, comprising a processing unit and a display unit,*

*said processing unit comprising:*

*(a) character information storing means for storing information of each of characters included in a document which is to be displayed on a display screen;*

*(b) color information storing means for storing color information as to at least one of the display color and background color of each of said characters;*

*(c) editorial area specifying means for specifying a desired editorial area of the document which is to be displayed on the display screen;*

*(d) editorial area storing means for storing the editorial area specified by said editorial area specifying means;*

*(e) color specifying means for specifying color information specifying at least one of the display color and background color of characters in each character of said document displayed on the display screen;*

*(f) color information processing means for updating the contents of said color information storing means which corresponds to said editorial area, on the basis of color specifying information from said color information specifying means; and*

*(g) dot pattern refresh storing means for storing dot pattern display information to be displayed on the display screen which is generated based on information stored in said character information storing means and said color information storing means, whereby dot pattern information stored in said dot pattern refresh storing means is modified in response to said updating of said color information storing means; and*

*said display unit comprising:*

*display means supplied with the dot pattern display information stored in said dot pattern refresh storing means for displaying a given character in a given color on the display screen.*

*22. A device according to claim 21, wherein said editorial area storing means includes a first memory for storing a start position of said editorial area and a second memory for storing an end position of said editorial area.*

*23. A device for editing a document in colors, comprising an input unit and a processing unit,*

*said input unit comprising:*

*(a) editorial area specifying means for specifying and outputting a desired editorial area of a document which is to be displayed on a display screen, in correspondence with said display screen; and*

*(b) color specifying means for specifying and outputting color information specifying at least one of the display color and background color of characters of said document displayed on the display screen;*

*said processing unit comprising:*

*(c) character information storing means for storing information of each of characters included in a document which is to be displayed on said display screen;*

*(d) color information storing means for storing color information as to at least one of the display color and background color of each of said characters;*

*(e) dot pattern refresh storing means for storing dot pattern display information which is generated based on information stored in said character information storing means and said color information storing means;*

*(f) editorial area storing means for storing a specified editorial area based on input information from said editorial area specifying means; and*

*(g) color information processing means for updating the contents of said color information storing means which corresponds to said editorial area stored in said editorial area storing means, on the basis of color specifying information from said color information specifying means, whereby dot pattern information stored in said dot pattern refresh storing means is modified in response to said updating of said color information storing means; and*

*(h) display means supplied with the information stored in said dot pattern refresh storing means for displaying a given character in a given color on said display screen.*

*24. A device according to claim 23, wherein said editorial area specifying means comprises:*

*cursor control means for controllably moving on the display screen, a cursor displayed thereon;*

*start position specifying means for specifying a first position where said cursor is located by said cursor control means as the start position of said editorial area; and*

*end position specifying means for specifying a second position where said cursor is located by said cursor control means as the end position of said editorial area.*

*25. A device according to claim 24, wherein said cursor control means includes a cursor control key provided on a keyboard and the movement of said cursor is controlled on the basis of a command from said cursor control key.*

*26. A device according to claim 24, wherein said start position specifying means and said end position specifying means include a special key provided on a keyboard, and said start position and said end position of said editorial area are specified on the basis of a command from said special key.*

*27. A device according to claim 24, wherein said editorial area storing means includes a first storage portion for storing information as to the start position of said editorial area specified by said start position specifying means, and a second storage portion for storing information as to the end position of said editorial area specified by said end position specifying means.*

*28. A device according to claim 24, wherein said color specifying means includes color specifying keys arranged on a keyboard, and the display color and background color of characters included in said specified editorial area of said document are specified on the basis of commands from said color specifying keys.*

*29. A device according to claim 24, wherein said editorial area storing means includes a first storage portion for*

*storing the start position of said editorial area and a second storage portion for storing the end position of said editorial area.*

*30. A method of editing a document in colors, by highlighting a character or character string included in a document, on a display screen, comprising the steps of:*

*(a) specifying a start position of a character or character string to be highlighted in correspondence with said display screen;*

*(b) specifying an end position of the character or character string to be highlighted in correspondence with said display screen;*

*(c) selecting color information for a specified character or character string to be highlighted; and*

*(d) modifying the character or character string specified by said specified start position and said specified end position, with said selected color information for display.*

*31. A method according to claim 30, wherein said start position specifying step (a) and said end position specifying step (b) are performed prior to said color information selecting step (c).*

*32. A method according to claim 30, wherein said start position specifying step (a) is performed prior to said end position specifying step (b).*

*33. A method of editing a document in colors, in highlighting a character or character string included in a document, on a display screen, comprising the steps executed in the sequence of:*

*(a) specifying a start position of a character or character string to be highlighted in correspondence with said display screen;*

*(b) specifying an end position of the character or character string to be highlighted in correspondence with said display screen;*

*(c) selecting color information for said specified character or character string to be highlighted; and*

*(d) modifying the character or character string specified by said specified start position and said specified end position, with said selected color information for display.*

*34. A device for editing data to be displayed in colors, comprising:*

*(a) character information storing means for storing information for each of a plurality of character included in data which is to be displayed on a display screen;*

*(b) color information storing means for storing color information as to at least one of the display color and background color of each of said characters;*

*(c) editorial area specifying means for specifying a desired editorial area of the document which is to be displayed on the display screen, in response to an input of an operator;*

*(d) editorial area storing means for storing the editorial area specified by said editorial area specifying means;*

*(e) color specifying means for specifying color information specifying at least one of the display color and background color of certain characters of said data to be displayed on the display screen in response to an input of the operator;*

*(f) dot pattern refresh generating means for generating dot pattern display information to be displayed on the display screen based on information stored in said character information storing means and said color information storing means; and*

*(g) color information processing means for updating the contents of said color information storing means which corresponds to said editorial area, on the basis of color specifying information from said color information specifying means, whereby dot pattern information generated by said dot pattern refresh generating means is modified in response to said updating of said color information storing means.*

* * * * *